… … …

United States Patent Office 3,591,647
Patented July 6, 1971

---

3,591,647
PROCESS FOR ISOMERIZING 5-ALKENYLNORBORNENE
Hiromi Kochi, Yoshiaki Komori, and Shigeaki Muto, Hitachi-shi, Japan, assignors to Hitachi Chemical Company, Ltd., Tokyo, Japan
No Drawing. Filed Apr. 22, 1970, Ser. No. 30,939
Claims priority, application Japan, Apr. 30, 1969, 44/33,443
Int. Cl. C07c 5/24
U.S. Cl. 260—666
3 Claims

ABSTRACT OF THE DISCLOSURE 5-alkenylnorbornene is isomerized to 5-alkylidene norbornene by allowing the 5-alkenylnorbornene to come in contact with a basic catalyst consisting of an alkali metal hydride and a dimethylsulfoxide or an aliphatic amine. The 5-alkenylnorbornene is utilized as the third component for ethylenepropylene rubber.

---

This invention relates to a process for isomerizing a 5-alkenylnorbornene, and more particularly to a novel process for preparing a 5-alkylidenenorbornene characterized by isomerizing a 5-alkenylnorbornene by a basic catalyst.

An ethylene-propylene rubber, a copolymer of ethylene and propylene, which will be hereinafter referred to as "EPDM" can be prepared at a low cost and has been watched as a synthetic rubber having many advantages, which have not been experienced in the conventional synthetic rubber, for example, good resistances to ozone, heat, etc. However, the EPDM has a disadvantage in mechanical brittleness. To remove such a disadvantage, sulfur curing has been attempted, but the EPDM is different from the unsaturated type synthetic rubber having double bonds in a main chain such as a styrene-butadiene rubber, which will be hereinafter referred to as "SBR," and a butadiene rubber, which will be hereinafter referred to as "Br," and can only undergo peroxide curing, because the structure of the EPDM is a saturated type. That is, the EPDM cannot undergo sulfur curing, and this has been a disadvantage of the EPDM.

However, such disadvantage has been overcome by introducing into the structure of the EPDM the third component which has unsaturated bonds and is capable of being cured by sulfur. Non-conjugated compounds, for example, dicyclopentadiene, 5-methylenenorbornene, which will be hereinafter referred to as "MNB" and 5-ethylidenenorbornene, which will be hereinafter referred to as "ENB," or the like have been often utilized as the third component. Above all, ENB has been regarded as the best third component in view of both good curing speed and good copolymerizability.

Heretofore, there has been known, as a typical example of an industrial scale process for preparing said ENB, a process for isomerizing 5-vinylnorbornene, which will be hereinafter referred to as "VNB" and can be obtained from cyclopentadiene, which will be hereinafter referred to as "CPD," and butadiene by Diels-Alder reaction, by allowing VNB to come in contact with a basic catalyst consisting of (a) an alkali metal deposited on a support, or (b) a mixture of a strong base of alkali metal and a polar organic solvent, or (c) a mixture of an alkali metal amide and a nitrogen base according to the following reactions (U.S. Pat. No. 3,347,944):

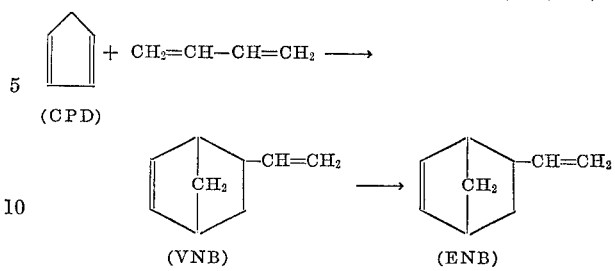

Examples of the alkali metal deposited on a support, the strong base of the alkali metal and the alkali metal amide include an alkali metal dispersed or adsorbed on a porous carrier such as a sodium dispersion, alumina-metallic sodium, or silica gel-metallic sodium; alkali metal hydroxides such as potassium hydroxide, sodium hydroxide, or lithium hydroxide; alkali metal amides such as potassium amide, or sodium amide; and alkali metal alkoxides such as sodium methoxide or potassium tert.-butoxide. Examples of the polar organic solvents include dimethylsulfoxide, dimethylformamide, dimethylacetamide, acetonitrile, ethylenediamine, diethylenetriamine, ammonia and the like.

However, in said prior art process, direct use of metallic sodium is very dangerous from the viewpoint of handling and hazard. Furthermore, operation to disperse or adsorb metallic sodium onto such porous carrier as alumina or silica gel takes much time and troublesome procedures. Furthermore, such alkali metal amides as sodium amide, etc. are relatively expensive, and it is difficult to commercially obtain potassium tert.-butoxide. In addition, isomerization of VNB takes much time according to said prior art process. These are disadvantages of the prior art process.

As a result of detailed studies on a process for isomerizing VNB by a basic catalyst consisting of a mixture of strong base of an alkali metal and a polar organic solvent, the present inventors have found that only the following mixture of the strong base of an alkali metal and the polar organic solvent had a definite effect upon the isomerization of VNB, that is, potassium hydroxide-dimethylsulfoxide, which will be hereinafter referred to as "DMSO," potassium tert.-butoxide-DMSO, metallic sodium-ethylenediamine, which will be hereinafter referred to as "EDA," sodium amide-EDA, sodium amide-diethylenetriamine, which will be hereinafter referred to as "DETA," and the like, and that no isomerization was effected and the desired ENB was not obtained when the following mixture was used, that is, sodium hydroxide-DMSO, lithium hydroxide-DMSO, sodium methylate-DMSO, sodium tert.-butoxide-DMSO, metallic potassium-DMSO, metallic sodium-DMSO, metallic lithium-DMSO, sodium hydroxide-dimethylformamide, which will be hereinafter referred to as "DMF," potassium hydroxide-DMF, potassium hydroxide-EDA, lithium hydroxide-EDA, sodium hydroxide-DETA and the like, and further that said disadvantages could be completely removed unexpectedly according to quite a new process using a mixture of a combination of a specific alkali metal hydride and DMSO or an aliphatic amine as a basic catalyst and at the same time VNB could be isomerized advantageously and readily, and the present inventors have accomplished the present invention.

The present invention is based on the above-mentioned findings and is to provide a process for isomerizing a 5-alkenylnorbornene, characterized by allowing the 5-alkenyl-norbornene to come in contact with a mixture of an alkali metal hydride having a formula, MH, wherein M represents an alkali metal atom selected from the group consisting of lithium atom, sodium atom and potassium atom, and DMSO or an aliphatic amine.

Suitable examples of said aliphatic amine used in the present invention include such aliphatic primary and secondary amines as ethylenediamine, diethylenetriamine, etc.

The present process is quite a new process for isomerization using a mixture of a specific alkali metal hydride and DMSO or an aliphatic amine as a basic catalyst. Said alkali metal hydrides can be commercially readily available at low costs, and are simple in handling. Owing to these advantages as well as capability of obtaining the desired product at a high purity in high yield for a very short time, the present process is particularly industrially advantageous. Furthermore, the greatest advantage of the present invention is that the reaction rate is very high.

Typical examples of 5-alkenylnorbornenes to be isomerized according to the present process and the desired 5-alkylidenenorbornenes are given below:

5-vinylnorbornene → 5-ethylidenenorbornene
5-propenylnorbornene → 5-propylidenenorbornene
5-butenylnorbornene → 5-butylidenenorbornene
5-decenylnorbornene → 5-decenylidenenorbornene The isomerization effect of the alkali metal hydrides which are used in the present process and have said general formula generally decreases in order of K>Na>Li.

In carrying out the present process, isomerization can be readily carried out usually by adding 4-alkenylnorbornene, which is to be isomerized, to a mixture of DMSO or said aliphatic amine, and said alkali metal hydride, but the sequence of adding these reactants is not always limited to the above-mentioned one.

Furthermore, the reaction temperature is not particularly limited. That is, the isomerization can be carried out at room temperature, but in order to proceed with the isomerization more smoothly, it is desirable to heat the reactants at about 50° to about 100° C. The isomerization is completed usually for several minutes to several hours. After the completion of the reaction, the desired 5-alkylidenenorbornene can be readily separated according to the conventional manner, for example, by distillation, chromatography, etc. of the reaction products.

Now, the present invention will be explained in detail, referring to examples:

EXAMPLE 1

A mixture of 42 ml. of DMSO and 4.8 g. (0.10 mole) of sodium hydride in oil (50% content) was stirred in a nitrogen gas stream at 65°–70° C. for one hour, and 12 g. (0.10 mole) of VNB was added thereto little by little, and subjected to isomerization reaction at 90° C. After the completion of isomerization reaction, the reaction products were analyzed by gas chromatography. The results are given in the following table.

| Reaction time (hour) | VNB (percent) | ENB (percent) |
|---|---|---|
| 0.8 | 22 | 78 |
| 3.8 | 10 | 90 |

EXAMPLE 2

A mixture of 45 ml. of DMSO and 4.0 g. (0.10 mole) of potassium hydride was stirred in a nitrogen gas stream at 65° to 70° C. for one hour, and 12 g. (0.10 mole) of VNB was added thereto little by little and subjected to reaction at 90° C. After the completion of the reaction, the reaction products are analyzed by gas chromatography. The results are given in the following table.

| Reaction time (hour) | VNB (percent) | ENB (percent) |
|---|---|---|
| 0.5 | 10 | 90 |
| 4 | 1 | 99 |

EXAMPLE 3

A mixture of 45 ml. of DMSO and 0.8 g. (0.10 mole) of lithium hydride was stirred in a nitrogen gas stream at 65°–70° C. for one hour, and 12 g. (0.10 mole) of VNB was added thereto little by little and subjected to reaction at 90° C. After the completion of the reaction, the reaction products were analyzed by gas chromatography. The results are given in the following table.

| Reaction time (hour) | VNB (percent) | ENB (percent) |
|---|---|---|
| 0.5 | 70 | 30 |
| 4.5 | 45 | 55 |

EXAMPLES 4–13

Reaction was carried out in the same manner as in Example 1. The results are given in the following table.

| Example Number | Catalyst system Alkali metal or its strong base, grams (mole) | Polar organic solvent, ml. | VNB, grams (mole) | Reaction condition Temperature (° C.) | Hour | ENB (percent) |
|---|---|---|---|---|---|---|
| 4 | NaOH 4 (0.10) | DMSO 40 | 6 (0.05) | 90 | 4 | 0 |
| 5 | LiOH 2.4 (0.10) | do | 12 (0.10) | 90 | 3 | 0 |
| 6 | KOH 4.8 (0.073) | DMSO 50 | 10 (0.071) | 110 | 4 | 80 |
| 7 | Na 1.2 (0.05) | DMSO 40 | 6 (0.05) | 90 | 4 | 0 |
| 8 | K 0.4 (0.01) | DMSO 50 | 24 (0.20) | 90 | 5 | 0 |
| 9 | Li 0.2 (0.029) | do | 24 (0.20) | 90 | 4 | 0 |
| 10 | CH₃ONa 2.7 (0.05) | DMSO 40 | 6 (0.05) | 90–100 | 3.3 | 0 |
| 11 | NaOH 2 (0.025) | DMF 50 | 24 (0.20) | 90 | 3 | 0 |
| 12 | KOH 4.8 (0.073) | do | 10 (0.071) | 110 | 4 | 0 |
| 13 | LiOH 1 (0.04) | do | 24 (0.20) | 90 | 3 | 0 |

EXAMPLE 14

One gram (0.0260 mole) of 62.5% sodium hydride was added to 10 g. of 98% EDA and stirred at room temperature for about one hour, and 72 g. (0.6 mole) of VNB was added dropwise to the dark violet reaction mixture. After the completion of dropwise addition, stirring was continued for a predetermined time, keeping the reaction temperature constant. After the completion of the reaction, a portion of the product solution was extracted with n-hexane and the degrees of isomerization under the respective reaction conditions were determined by gas chromatography. The results are given in the following table.

| Reaction temperature °C. | Time (minutes) | VNB (percent) | ENB (percent) |
|---|---|---|---|
| 30 | 5 | 60 | 40 |
|  | 10 | 50 | 50 |
|  | 15 | 35 | 65 |
| 50 | 5 | 53 | 47 |
|  | 10 | 30 | 70 |
|  | 15 | 15 | 85 |
| 70 | 5 | 30 | 70 |
|  | 10 | 10 | 90 |
|  | 15 | 2 | 98 |

EXAMPLE 15

1.5 gram (0.0173 mole) of 45% potassium hydride was added to 25 g. of 98% EDA and stirred at about 80° C. for 45 minutes, 24 gram (0.20 mole) of VNB was added dropwise to the orange reaction mixture over a period of about 10 minutes. After the completion of the dropwise addition, stirring was continued for 30 minutes, keeping the reaction temperature at 60° C. After the completion of the reaction, the reaction product was extracted with 200 ml. of n-hexane, and then dried with sodium sulfate. Then, the dried extract was distilled under a reduced pressure, whereby 18.5 g. of ENB, a fraction of boiling point of 68° C./24 mm. Hg, was obtained in yield of 77.0%. The distillate was analyzed by gas chromatography, whereby the degree of isomerization was found to be 98.8%.

EXAMPLE 16

0.3 gram (0.0375 mole) of lithium hydride was added to 25 g. of 98% EDA, and stirred at about 80° C. for 45 minutes. 24 gram (0.20 mole) of VNB was slowly added dropwise to reddish violet reaction mixture. After the completion of dropwise addition, stirring was continued for 30 minutes, keeping the reaction temperature at 60° C. After the completion of the reaction, a portion of reaction product solution was extracted with n-hexane and analyzed by gas chromatography, whereby the degree of isomerization was found to be 98.6%.

EXAMPLE 17

One gram (0.0260 mole) of 62.5% sodium hydride was added to 25 g. of DETA and stirred at 70° C. for 30 minutes. The color of the reaction solution was gradually changed to violet. After the reaction temperature had been lowered to 60° C., 24 g. (0.20 mole) of VNB was added thereto, and stirring was continued for 30 minutes. After the completion of the reaction, a portion of the reaction product solution was extracted with n-hexane and analyzed by gas chromatography, whereby the degree of isomerization was found to be 98.6%.

EXAMPLE 18

Two gram (0.025 mole) of 45% potassium hydride was added to 25 g. of DETA and stirred at 100° C. for one hour. The color of the reaction solution was changed to orange. Then, 36 g. (0.3 mole) of VNB was added thereto, and after the reaction had been carried out, as it was, at 100° C. for one hour, a portion of the reaction product solution was extracted with n-hexane and analyzed by gas chromatography, whereby the degree of isomerization was found to be 98.0%.

EXAMPLE 19

One gram (0.1250 mole) of lithium hydride was added to 25 g. of DETA and stirred at 100° C. for one hour. The color of the reaction solution was changed to violet. Then, 36 g. (0.30 mole) of VNB was added thereto, and after the reaction had been carried out, as it was, at 100° C. for one hour, a portion of the reaction product solution was extracted with n-hexane and analyzed by gas chromatography, whereby the degree of isomerization was found to be 92.0%.

EXAMPLES 20–35

The reaction was carried out in the same manner as in Example 16, and the results are given in the following table.

| | Catalyst system | | Reaction conditions | | | |
|---|---|---|---|---|---|---|
| Example No. | Alkali metal or its strong base, grams | Polar organic solvent, grams | VNB, grams (mole) | Temperature (° C.) | Hour | ENB percent |
| 20 | NaOH 4(0.10 mole) | EDA 25 | 24(0.20) | 90 | 3 | 0 |
| 21 | KOH 5.6 (0.10 mole) | do | 24(0.20) | 90 | 3 | 0 |
| 22 | LiOH 2.4(0.10 mole) | do | 24(0.20) | 90 | 4 | 0 |
| 23 | Na 0.6 (0.0262 g.-atom) | do | 36(0.30) | 110 | 2 | 97 |
| 24 | K 1.0 (0.0257 g.-atom) | do | 24(0.20) | 110 | 2 | 96 |
| 25 | Li 0.2 (0.0286 g.atom) | do | 24(0.20) | 110 | 2 | 75 |
| 26 | Ca(OH)₂ 7.4(0.10 mole) | do | 24(0.20) | 100 | 3 | 0 |
| 27 | CaH₂ 1.0(0.025 mole) | do | 24(0.20) | 100 | 2 | 0 |
| 28 | NaOH 4.0 (0.10 mole) | DETA 25 | 24(0.20) | 100 | 3 | 0 |
| 29 | KOH 5.6 (0.10 mole) | do | 24(0.20) | 90 | 4 | 0 |
| 30 | LiOH 2.4 (0.10 mole) | do | 24(0.20) | 90 | 4 | 0 |
| 31 | Na 0.6 (0.0262 g.atom) | do | 36(0.30) | 150 | 2 | 46 |
| 32 | K 1.0 (0.0257 g.-atom) | do | 24(0.20) | 150 | 3 | 50 |
| 33 | Li 0.2 (0.0286 g.-atom) | do | 24(0.20) | 150 | 3 | 40 |
| 34 | Ca(OH)₂ 7.4 (0.10 mole) | do | 24(0.20) | 100 | 3 | 0 |
| 35 | CaH₂ 1.0 (0.025 mole) | do | 24(0.20) | 120 | 3 | 0 |

The gas chromatography used in examples was carried out under the following conditions:

(1) Column: DC–550, 15 wt. percent, Celite carrier, stainless steel: 2 m.
(2) Column temperature: 110° C.
(3) Filling temperature: 160° C.
(4) Carrier gas: Nitrogen gas, 25 ml./min. (0.8 kg./cm.$^3$)
(5) Gas chromatograph: Hitachi Type K–53

What is claimed is:

1. A process for isomerizing a 5-alkenylnorbornene, which comprises contacting a 5-alkenylnorbornene with a mixture consisting of an alkali metal hydride having the general formula, MH, where M represents a lithium atom, sodium atom or potassium atom, and dimethylsulfoxide or an aliphatic amine as a catalyst.

2. A process according to claim 1, wherein the contact is effected at a temperature from room temperature to 100° C.

3. A process according to claim 1, wherein the aliphatic amine is ethylenediamine or diethylenetriamine.

References Cited

UNITED STATES PATENTS 3,347,944  10/1967  Fritz et al. _____ 260—666

DELBERT E. GANTZ, Primary Examiner

V. O'KEEFE, Assistant Examiner